(12) United States Patent
Briggs et al.

(10) Patent No.: US 10,447,414 B2
(45) Date of Patent: Oct. 15, 2019

(54) DEVICE OBFUSCATION OF POSITION TRACKING

(71) Applicant: Apple Inc., Cupertino, CA (US)

(72) Inventors: Elliot S. Briggs, Santa Cruz, CA (US); Zhu Ji, San Jose, CA (US); Johnson O. Sebeni, Fremont, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/715,058

(22) Filed: Sep. 25, 2017

(65) Prior Publication Data

US 2018/0351661 A1    Dec. 6, 2018

Related U.S. Application Data

(60) Provisional application No. 62/513,228, filed on May 31, 2017.

(51) Int. Cl.
| | |
|---|---|
| *H04B 17/10* | (2015.01) |
| *G01S 5/02* | (2010.01) |
| *H04W 4/02* | (2018.01) |
| *H04B 17/18* | (2015.01) |
| *H04W 4/90* | (2018.01) |

(52) U.S. Cl.
CPC .......... *H04B 17/104* (2015.01); *G01S 5/0284* (2013.01); *H04B 17/18* (2015.01); *H04W 4/02* (2013.01); *H04W 4/90* (2018.02)

(58) Field of Classification Search
CPC ....... H04B 17/18; H04B 17/104; H04W 4/02; H04W 4/90

USPC ...................................................... 455/456.1
See application file for complete search history.

(56) References Cited

U.S. PATENT DOCUMENTS

2017/0317798 A1* 11/2017 Kim ...................... H04W 72/12
2018/0076938 A1* 3/2018 Wang ..................... H04L 5/0044

OTHER PUBLICATIONS

"3rd Generation Partnership Project; Technical Specification Group Radio Access Network; Evolved Universal Terrestrial Radio Access (E-UTRA); Requirements for support of radio resource management (Release 14)", 3GPP TS 36.133 V14.3.0, p. 138, Mar. 2017.
"3rd Generation Partnership Project; Technical Specification Group Radio Access Network; Evolved Universal Terrestrial Radio Access (E-UTRA); Physical channels and modulation (Release 14)", 3GPP TS 36.211 V14.2.0, p. 154, Mar. 2017.

(Continued)

*Primary Examiner* — Chuck Huynh
(74) *Attorney, Agent, or Firm* — Dickinson Wright RLLP

(57) ABSTRACT

A user of a device desires that geographic position information of the device be kept private. A network may track a geographic position of a device using timing advance (TA) data and also a passive attacker may attempt to track the geographic position of the device by observing base station TA commands. In embodiments provided herein, a device diminishes or obfuscates geographic position information by using a timing change value while not disturbing synchronization of uplink signals from multiple devices arriving at a base station. To resist an averaging solution by an observer, the device in some embodiments adjusts the timing change value based on an internal timer. In an emergency call situation, the method permits the base station to obtain geographic position information based on TA procedures.

20 Claims, 12 Drawing Sheets

(56) References Cited

OTHER PUBLICATIONS

"3rd Generation Partnership Project; Technical Specification Group Radio Access Network; Evolved Universal Terrestrial Radio Access (E-UTRA); Radio Resource Control (RRC); Protocol specification (Release 14)", 3GPP TS 36.331 V14.2.0, pp. 57-122, Mar. 2017.
"3rd Generation Partnership Project; Technical Specification Group Radio Access Network; Evolved Universal Terrestrial Radio Access (E-UTRA); Physical layer procedures (Release 14)", 3GPP TS 36.213 V14.1.0, pp. 12, 13, 50-52, Dec. 2016.
"3rd Generation Partnership Project; Technical Specification Group Radio Access Network; Evolved Universal Terrestrial Radio Access (E-UTRA); Medium Access Control (MAC) protocol specification (Release 14)", 3GPP TS 36.321 V14.2.0, 106 pages (whole document), Mar. 2017.
"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)", 3GPP TS 36.300 V11.1.0, 194 pages (whole document), Mar. 2012.
"LTE; Evolved Universal Terrestrial Radio Access (E-UTRA); Physical channels and modulation (3GPP TS 36.211 version 12.7.0 Release 12)", ETSI TS 136 211 V12.7.0, 138 pages (whole document), Oct. 2015.

\* cited by examiner

DEVICE OBFUSCATION OF POSITION TRACKING

CROSS REFERENCE TO RELATED APPLICATION

This application claims benefit of U.S. Provisional Patent Application No. 62/513,228 entitled "DEVICE OBFUSCATION OF POSITION TRACKING," filed on May 31, 2017, which is hereby incorporated by reference.

FIELD

The described embodiments relate generally to multiple access wireless communications using electronic devices, including systems and techniques for a device to obfuscate timing information and thus to diminish position information provided to a network.

BACKGROUND

Security and privacy of a user of a wireless device may be attacked by a malicious party. One class of attacks is based on a passive attacker listening to timing advance signals transmitted to a device that is executing an attach process. Also, a user of a device may prefer that a mobile network not track the user's geographic position within a cell or base station coverage area.

The Third Generation Partnership Project (3GPP) standards development organization has developed and continues to develop a set of standards referred to as Long Term Evolution (LTE). Some embodiments disclosed herein are illustrated with respect to the 3GPP LTE standards. Further details of LTE standards can be found in i) 3GPP 36.213 v14.2.0, March 2017, "Physical layer procedures," (hereinafter "3GPP 36.213"), ii) 3GPP 36.211 v14.2.0, March 2017, "Physical channels and modulation," (hereinafter "3GPP 36.211"), iii) 3GPP 36.321, v14.2.0, March 2017, "Medium Access Control (MAC) protocol specification," (hereinafter "3GPP 36.321"), iv) 3GPP 36.331, v14.2.0, March 2017, "Radio Resource Control (RRC) Protocol Specification," (hereinafter "3GPP 36.331"), v) 3GPP 36.133 v14.3.0, March 2017, "Requirements for support of radio resource management," (hereinafter "3GPP 36.133"), and vi) 3GPP TS 36.300 v11.1.0, March 2012, "Overall Description" (hereinafter "3GPP 36.300").

In general, a base station tower may be used by an MNO to operate one or more sectors, using directional antennas. A common arrangement is to use antennas with a 120 degree beam pattern and maintain three sectors from a single tower at a given frequency band. From the point of view of the MNO, a cell is a geographic region served by one base station or one sector. The signals observed in that geographic region, from the point of view of a UE, may be referred to as a cell.

A base station in an LTE system is generally referred to as an eNodeB. A UE may also be referred to as a wireless device or device herein.

SUMMARY

Representative embodiments set forth herein disclose various systems and techniques for a device to maintain geographic position information private by determining a timing change value for use in a network attach procedure. A base station provides feedback information in terms of a timing advance (TA) value and the device corrects its uplink (UL) timing based on the TA value and based on the timing change value.

In order to improve security and privacy of a user of a wireless device, the device may diminish the information in TA signals. This effectively hides the range of a device within a cell or coverage area from the base station and from possible malicious parties. In some embodiments, the device listens to downlink (DL) frame timing and then responds on the uplink with a timing change value that makes the device appear at a range from the base station other than the actual range from the base station. If the user is making an emergency call, embodiments provided herein allow the geographic position of the device to be detected by the base station. In the emergency call situation, the device provides signals with the timing expected by the base station based on the actual range of the device.

The device, in some embodiments, observes downlink frame timing, generates a timing change value and starts a timer. The device then performs an attach procedure to the base station while using the timing change value to avoid providing geographic position information such as range to the base station. This avoidance of providing information is sometimes referred to as obfuscation herein. The device, in some embodiments, uses a random method to sequentially randomize timing change values used, with the events in the sequence initiated by expiration of the timer. In some embodiments, the device tracks a TA value from a previous base station attach event to produce a tracked TA value. The device uses the tracked TA value to make the device appear to be at a range of zero from the base station (i.e., the base station observes a responsive signal which has been advanced in time so far that there appears to be no time-of-flight delay). In either the random method or the apparent zero-delay method, if an emergency call occurs, embodiments provided herein include observing the device downlink frame timing followed by the device using normal uplink frame timing so that the network can find the geographic position of the device. The network may use map overlay information, triangulation (multiple observations by base stations separated in space), and/or cell sector sectorization to narrow down the possible location of a device.

The device may be near a cell edge. In some embodiments, the device chooses a random value for the timing change value, but limits the random value in such a way that the device does not appear to have moved outside of the cell.

In some instances, an attacker may use two base stations to try to encourage a handover of the device. In order to increase the unpredictability of the device actions, expiry of the timer may be ignored in some cases, with a new timing change value generated by the device at handover instead of at timer expiry.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described will become apparent from the following Detailed Description, Figures, and Claims.

BRIEF DESCRIPTION OF THE DRAWINGS

The included drawings are for illustrative purposes and serve only to provide examples of possible structures and arrangements for the disclosed systems and techniques for intelligently and efficiently managing calls and other communications between multiple associated user devices. These drawings in no way limit any changes in form and detail that may be made to the embodiments by one skilled in the art without departing from the spirit and scope of the embodiments. The embodiments will be readily understood by the following detailed description in conjunction with the accompanying drawings, wherein like reference numerals designate like structural elements.

DETAILED DESCRIPTION

Representative applications of apparatuses, systems, and methods according to the presently described embodiments are provided in this section. These examples are being provided solely to add context and aid in the understanding of the described embodiments. It will thus be apparent to one skilled in the art that the presently described embodiments can be practiced without some or all of these specific details. In other instances, well known process steps have not been described in detail in order to avoid unnecessarily obscuring the presently described embodiments. Other applications are possible, such that the following examples should not be taken as limiting.

System

Figure 1:
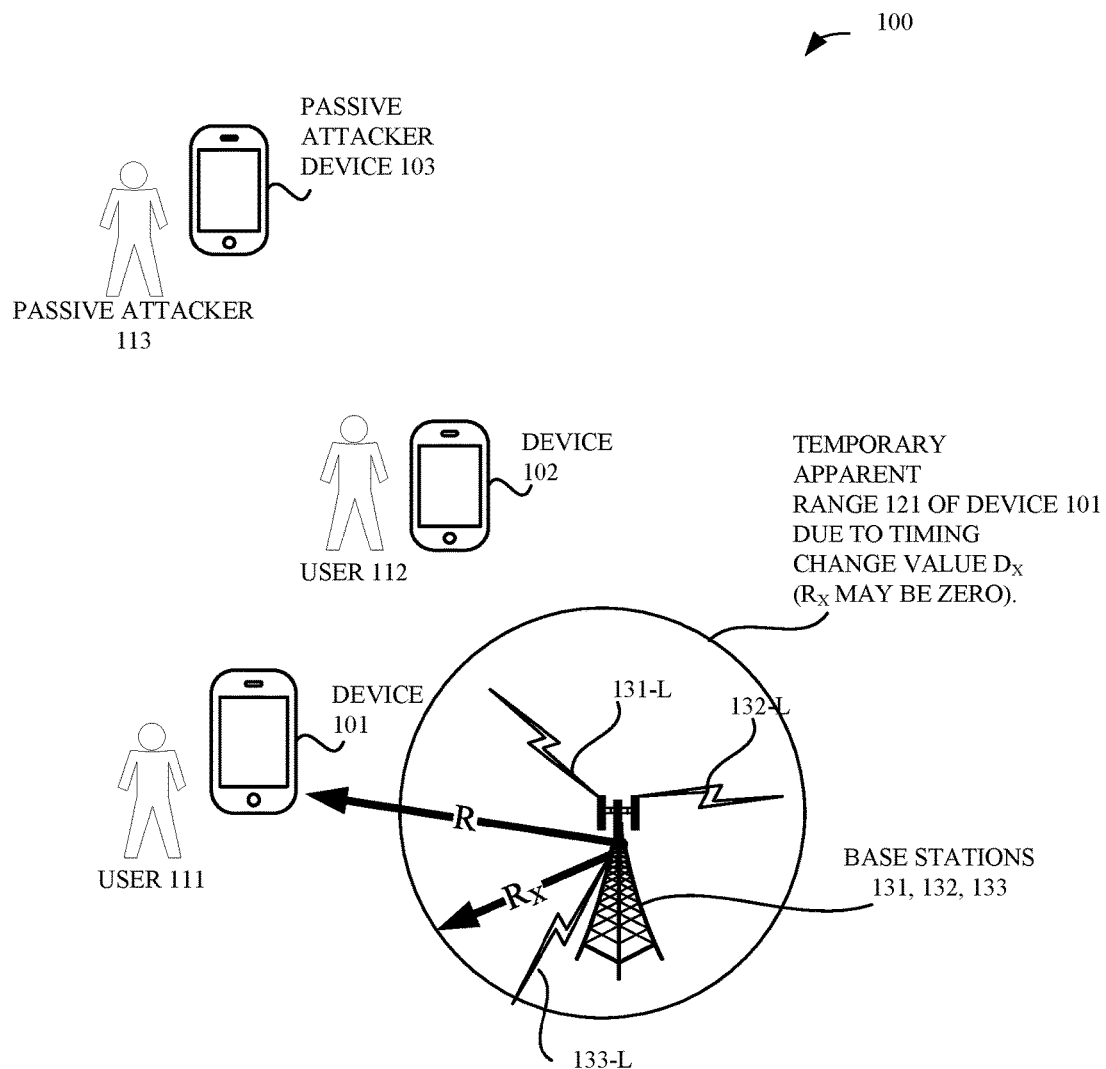
FIG. 1 illustrates an exemplary system including subscribers, devices, and base stations, according to some embodiments. Also illustrated are a passive attacker and a passive attacker device.

FIG. 1 illustrates a device 101 in a system 100. The device 101 may be in the possession of a user 111. The device 101 is served by a network, including base stations 131, 132, and 133 (shown in an exemplary sector arrangement). Other base stations are present but not shown. A user 112 with a device 102 is also served by the radio network. A passive attacker 113 may use a passive attacker device 103 to observe communications between the network and the device 101.

The device 101 is at a distance R from base station 131. A radio signal on link 131-L from the base station 131 to the device 101 requires a time $D_F$ to travel the distance R. Using methods presented herein, the device 101 practices an attach process by which a temporary apparent range 121 of the device 101 from the base station 131 is a distance $R_X$. $R_X$ may be zero, that is, in some embodiments, the device 101 may appear to be located with the tower supporting the base station 131. The method is not limited to base stations in a sector arrangement.

In this context, to obfuscate refers to making uncertain the true range of the device from a serving base station. The serving base station knows that the device is within cell coverage of the serving base station, but the serving base station does not know how far out the device is from the base station tower. The base station has some information, but other information is artificial and does not correspond to the true range R of the device. That is, R and $R_X$ are different, with $R_X$ being the apparent range of the device from the tower. Various methods provided herein withhold some position information from a serving base station and thus also from a passive observing attacker.

Logic

Figure 2:
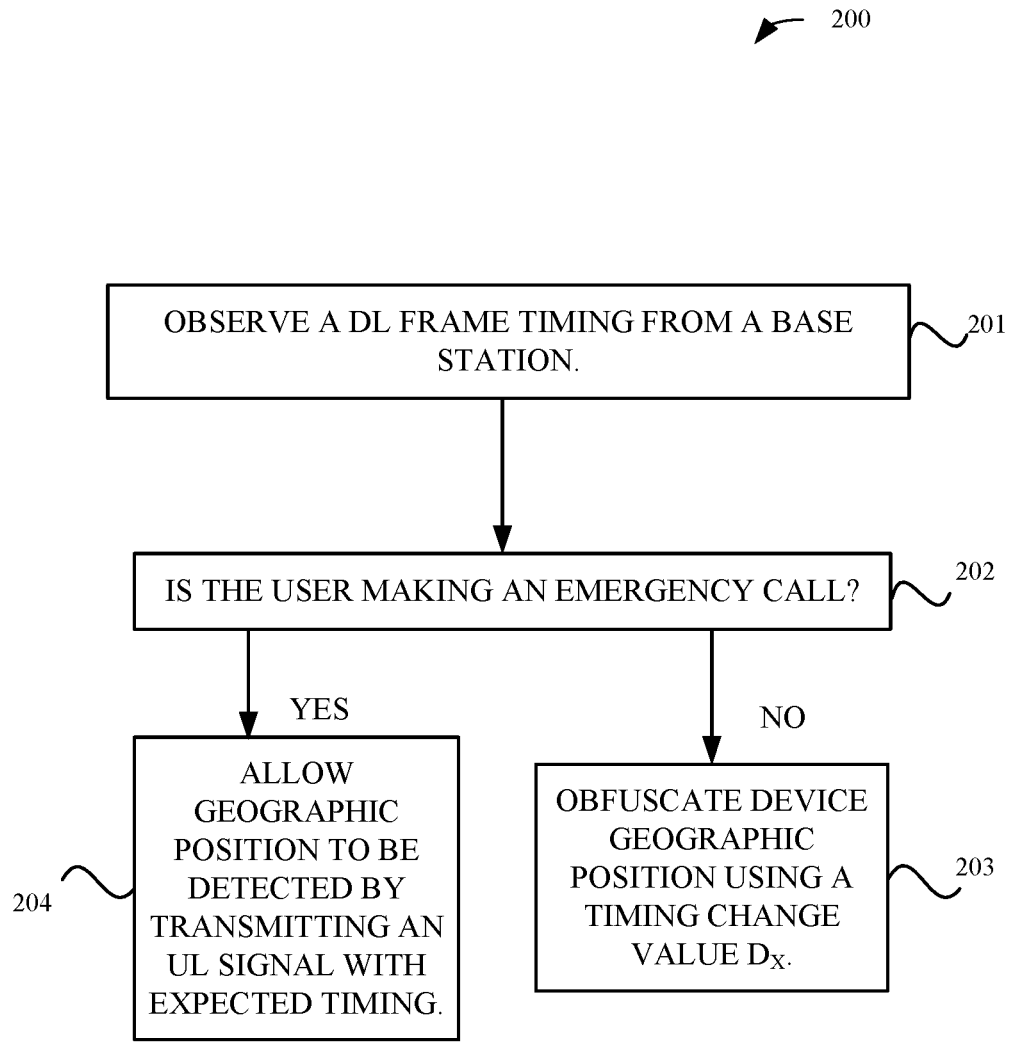
FIG. 2 illustrates exemplary logic for obfuscation of a device geographic position when the user is not making an emergency call, according to some embodiments.

FIG. 2 provides exemplary logic 200 for device obfuscation of position tracking. At 201, the device observes a DL frame timing from a base station. In some embodiments, at 202, the device determines whether a user of the device is making an emergency call. If yes, the logic flows to 204 and the device transmits an UL signal during an attach procedure with an expected timing. If no, the logic flows to 203 and the device obfuscates device geographic position by using a timing change value $D_X$.

In some embodiments, exemplary logic 200 is realized using a method at a UE including receiving, from a base station, a first downlink (DL) frame, wherein the first DL frame starts at a first DL start time; determining a second DL start time of a second DL frame based on the first DL start time; determining a first timing relation; generating a first timing change value, wherein: i) the first timing change value includes a pseudo-random component, and ii) the first timing changing value is intended to obfuscate a geographic position of the UE; transmitting a first uplink (UL) frame at a first UL start time with respect to the second DL start time, wherein the first UL start time is based on the timing relation and the first timing change value, wherein the first UL frame is part of a network attach process; and determining that a user of the UE has requested an emergency call. In some embodiments, the method realizing exemplary logic 200 includes beginning a second network attach process including using a second timing change value of zero to allow the base station to estimate the geographic position of the UE.

State Flow

Figure 3:
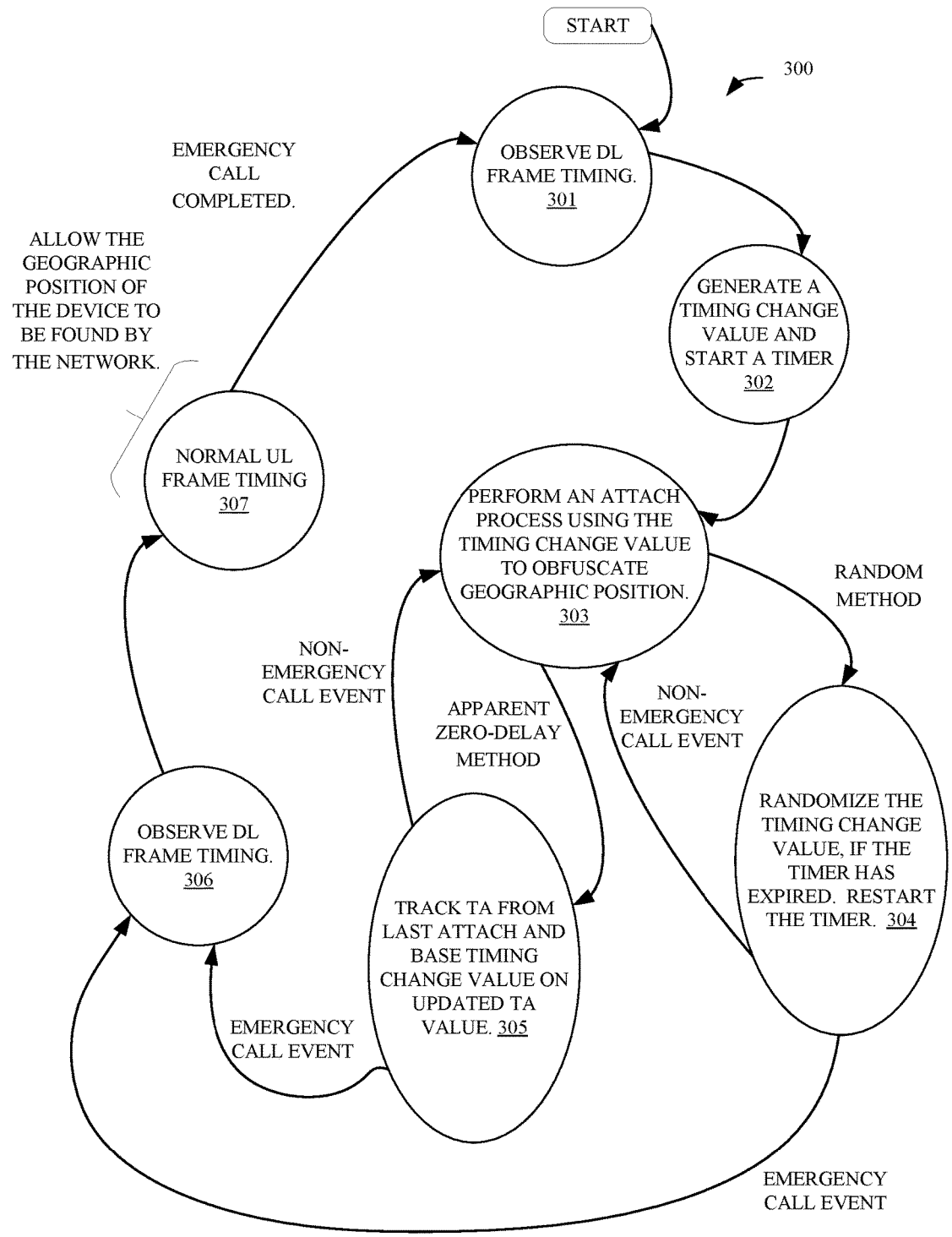
FIG. 3 illustrates an exemplary state flow for obfuscation of a device geographic position, according to some embodiments.

FIG. 3 illustrates an exemplary state flow 300. At 301, the device observes DL frame timing. At 302, the device generates a timing change value (DX) and, in a Random Method (further discussed below), starts a timer. At 303, the device performs an attach process using the timing change value DX to obfuscate the device geographic position. After the attach procedure has completed, the state flow progresses to state 304 for a Random Method and to state 305 for an Apparent Zero-Delay Method. At 304, the Random Method randomizes the timing change value if a timer has expired, before a next attach event (a return to state 303). At 305, the Apparent Zero-Delay Method tracks TA to the base station in the time interval since the last attach process to produce an updated TA value. Before the next attach event (a return to state 303), the timing change value is set to the updated TA value. From either state 304 or 305, if a user of the device makes an emergency call, the state flow progresses to state 306 where DL timing is observed and then to state 307 where normal UL timing is used so that the serving base station can obtain accurate geographic position information of the device. After the emergency call is completed, the state flow passes to state 301 and then 302 to generate a new timing change value.

The $D_X$ value is stored, in some embodiments, each time it is generated, e.g., states 302, 304, and 305. For 305, the $D_X$ value is equal to the updated TA value.

Timing Sequences

Figure 4A:
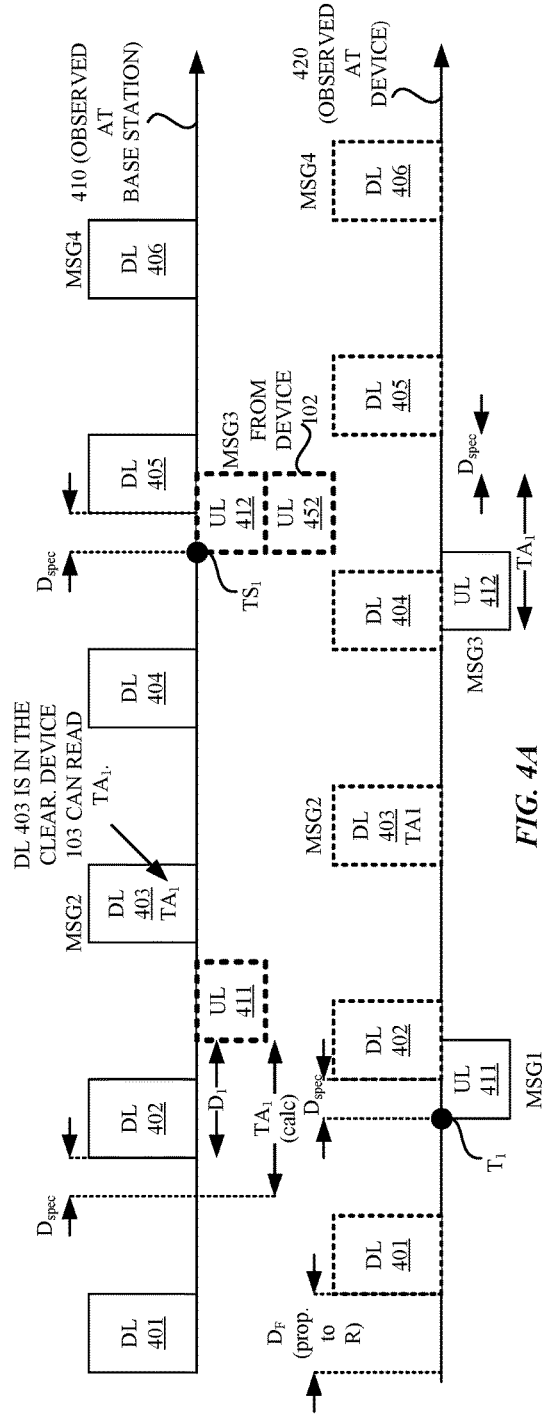
FIG. 4A illustrates exemplary DL and UL TA timelines which allow a base station to learn device geographic position information.

FIG. 4A illustrates a timing sequence using axes 410 (events observed at the base station 131, including DL transmissions 401, . . . , 404, 405, 406) and 420 (events observed at the device 101). The goal of the process is that a scheduled transmission from the device 101 is at least approximately synchronized with arrival of a scheduled transmission from another device, e.g., device 102. This synchronization is evident at the time $TS_1$ marked on the axis 410. Messages UL 412 and UL 452 from device 101 and device 102, respectively, arrive together at the base station 131 a time $D_{spec}$ before the commencement of a next base station frame (in this example, frame DL 405). This kind of uplink-downlink timing relation is illustrated in 3GPP 36.211 under the section "Timing."

A RACH sequence includes four messages, sometimes referred to as MSG1, MSG2, MSG3, and MSG4. Annotated instances of these messages are shown in FIG. 4A: UL 411, DL 403, UL 412, and DL 406, respectively. 3GPP 36.300 provides discussion of four such example message in a RACH sequence (see the contention-based random access procedure).

The base station 131 and the device 101 achieve this timing event at $TS_1$ using timing advance value $TA_1$. The value $TA_1$ compensates for propagation delay such as the exemplary value $D_F$ annotated at the beginning of the axis 420. Initially, $D_F$ is unknown to both base station and the device. The range R and $D_F$ are related by the speed of light for a line-of-sight path between the device 101 and the base station 131, i.e., $c=R/D_F$.

The value $TA_1$ learned by the device 101 first sending a random access preamble (sometimes referred to as MSG1) during a contention based random access procedure which is exemplary of an attach process. Further details on random access can be found in, e.g., the contention-based random access procedure discussion in 3GPP 36.300. At a time $T_1$, the device 101 sends the message UL 411 a time $D_{spec}$ before a DL frame 402 begins. The base station 131 observes message UL 411 a time $D_F$ later, and the arrival of message UL 411 is shown as dashed box below the axis 410. The base station then calculates, as illustrated with the relationships of $D_{spec}$, $D_1$, and $TA_1$ in FIG. 4A, the value $TA_1$ based on the arrival of message UL 411. The base station 131 informs the device 101 of the $TA_1$ value using DL 403, a random access response (RAR) message sometimes referred to as MSG2. DL 403 is sent in the clear, that is, without ciphering applied. Passive attacker 113 can learn $TA_1$ using passive attacker device 103. Based on $TA_1$, the passive attacker 113 can learn position information about the distance R from base station 131 to the device 101. However, generally user 111 does not want other parties to track his or her geographic position.

Based on DL 403, the device 101 thus learns $TA_1$ when DL 403 arrives at the device 101. In an expected, normal or standard response without timing obfuscation, the device 101 then advances (or corrects) the transmission time of its next message, in this example message UL 412, by an amount $TA_1$. Subsequently, message UL 412 arrives at the base station 131 with leading edge positioned at the time $TS_1$ as desired in some synchronization with a frame message UL 452 arriving from the device 102. The benefit of this arrangement is that system capacity is improved by having UL frames arrive together. For example, orthogonality between received transmissions is improved. However, the base station 131 has learned the value $D_F$ and thus has an estimate of the range R.

Figure 4B:
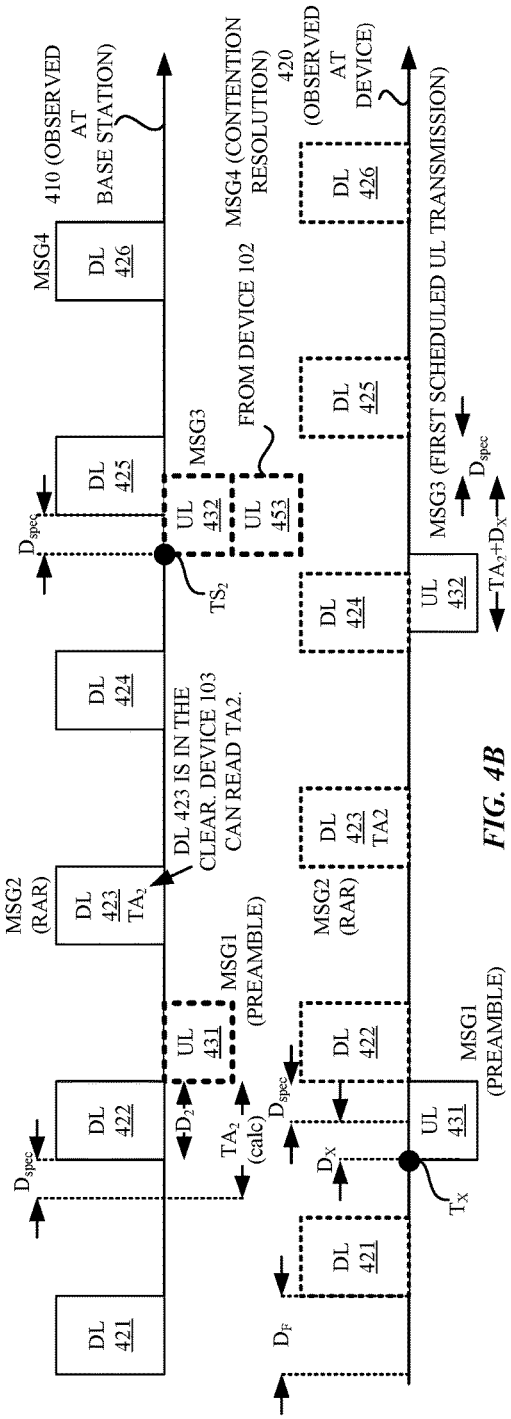
FIG. 4B illustrates exemplary DL and UL timelines for obfuscation of a device geographic position while maintaining UL synchronization with a second UE, according to some embodiments.

FIG. 4B provides a method of presenting the device 101 as being at a range $R_X$ different than R, while still maintaining the synchronization of arriving uplink frames from different devices at the base station. The timing features of the method are illustrated in exemplary FIG. 4B. The events observed at the base station begin with DL transmissions 421, 422 and continuing to DL transmissions 424, 425, etc.

The events are similar to FIG. 4A, with the exception that the device generates a timing change value $D_X$ and transmits the random access preamble (MSG1) with a time of its leading edge different than the base station expects by the amount $D_X$. In general, $D_X$ may be positive or negative. Because of this timing value change, $D_X$, the base station calculates a timing advance value $TA_2$ and transmits it to the device 101 using the message DL 423. Message DL 423 is an instance of MSG2 in the RACH sequence. The base station 131, using the calculated value $TA_2$, may estimate that the device 101 is at a range $R_X$ while actually it is at a range R.

Passive attacker device 103 can read $TA_2$ because it is sent in the clear (no encryption) in the message DL 423. However, $TA_2$ has been perturbed by the amount $D_X$ and so the passive attacker 113 gains little or no information about the geographic position of the device 101 (and little or no information of the user 111) from the recovered $TA_2$ value since it is perturbed or obfuscated by the amount $D_X$.

The device receives the message DL 423. The device, knowing that it has perturbed the initial transmission by the timing change value $D_X$, adds $D_X$ to $TA_2$ to arrive at a timing correction for the transmission of MSG3, in this example, UL 432. UL 432 then arrives at the base station 131 with leading edge at the time $TS_2$ and in synchronization with an uplink frame from another device measured with respect to DL 425, in this example, UL 453 from the device 102. Subsequently, the device 101 receives a contention resolution message DL 426 (MSG4) and continues with uplink data transmission to the base station 131 until re-entering idle mode. After the time $TS_2$ (when arriving UL transmissions are aligned as observed at the base station), UL transmission by the device 101 operates normally without further added time shift or obfuscation in excess of $D_X$. Motion of the device 101 will cause a variation of arrival time and so the base station may observe relative location changes. Such relative location changes are of little use to the base station, however, since the absolute location has been obscured by the imposition of the perturbation $D_X$.

Attach Process, Random Access Procedure

Figure 5:
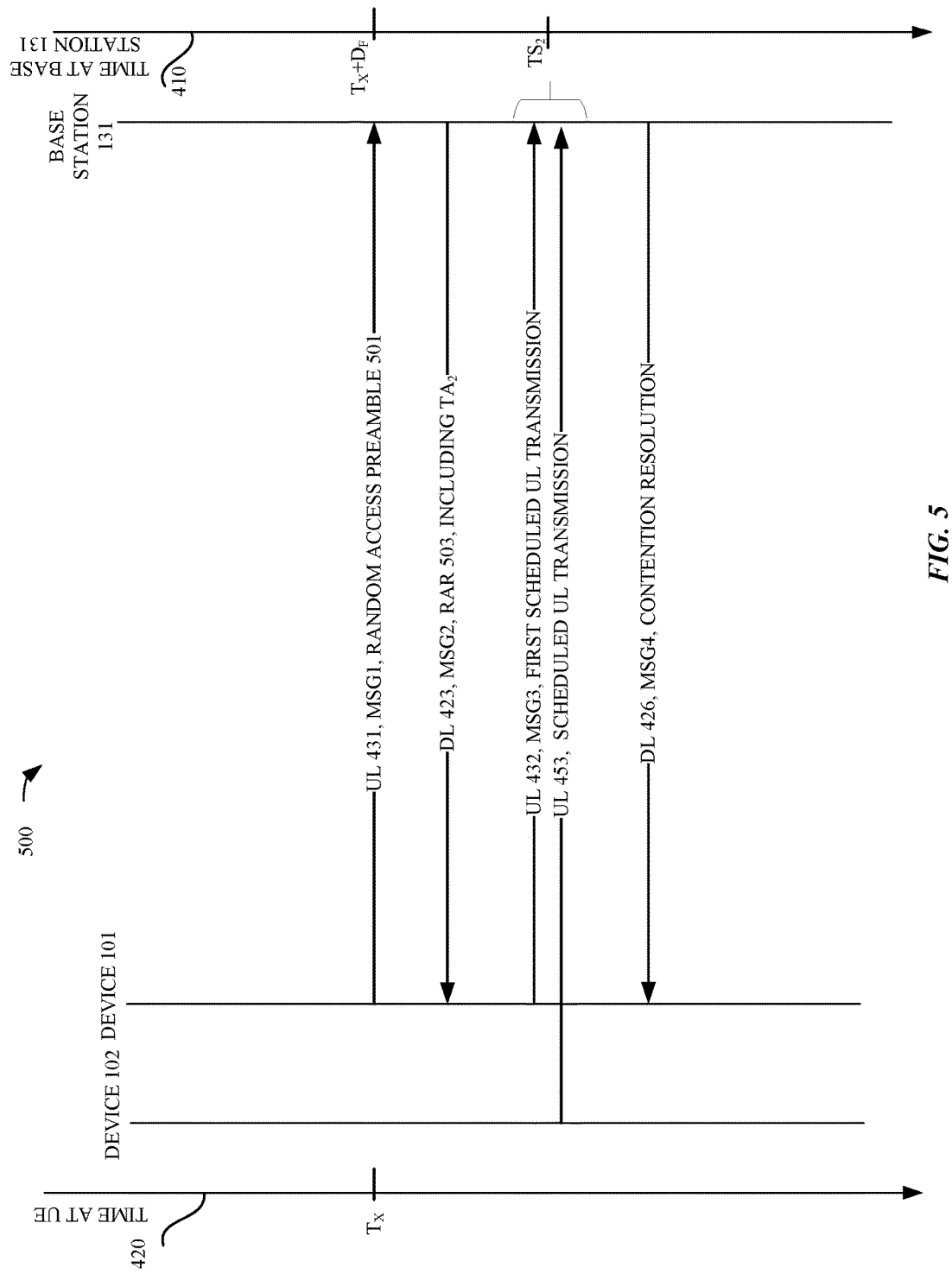
FIG. 5 illustrates an exemplary attach procedure in which a UE uses a timing change value while maintaining UL synchronization with a second UE, according to some embodiments.

FIG. 5 illustrates an exemplary random access procedure 500 corresponding to the events of FIG. 4B. The UE time axis 420 is shown at the left. The base station time axis 410 is shown at the right. The illustration is schematic and the axes are not shifted by the time $D_F$, but the effects of $D_F$ are annotated on the figure.

At the time $T_X$, device 101 sends UL 431 including random access preamble 501. The base station responds with DL 423 including the $TA_2$ value. The device 101 then responds with UL 432, a first scheduled transmission. Coincident with the arrival of UL 432 at the base station, UL 453 from the device 102 arrives at the base station. These are illustrated as arriving at a time $TS_2$. Although these arrive together, some separation is shown in the figure for plain reading. There may be some difference in arrival time due to coarseness of the standard timing advance process. This coarseness is not due to the timing change value $D_X$.

The base station 131 then sends message DL 426 (a contention resolution message) and the device 101 continues with data transmission with the base station 131. Further details of data traffic handling can be found in 3GPP 36.321 and 36.331.

Logic, Random Method

Figure 6:
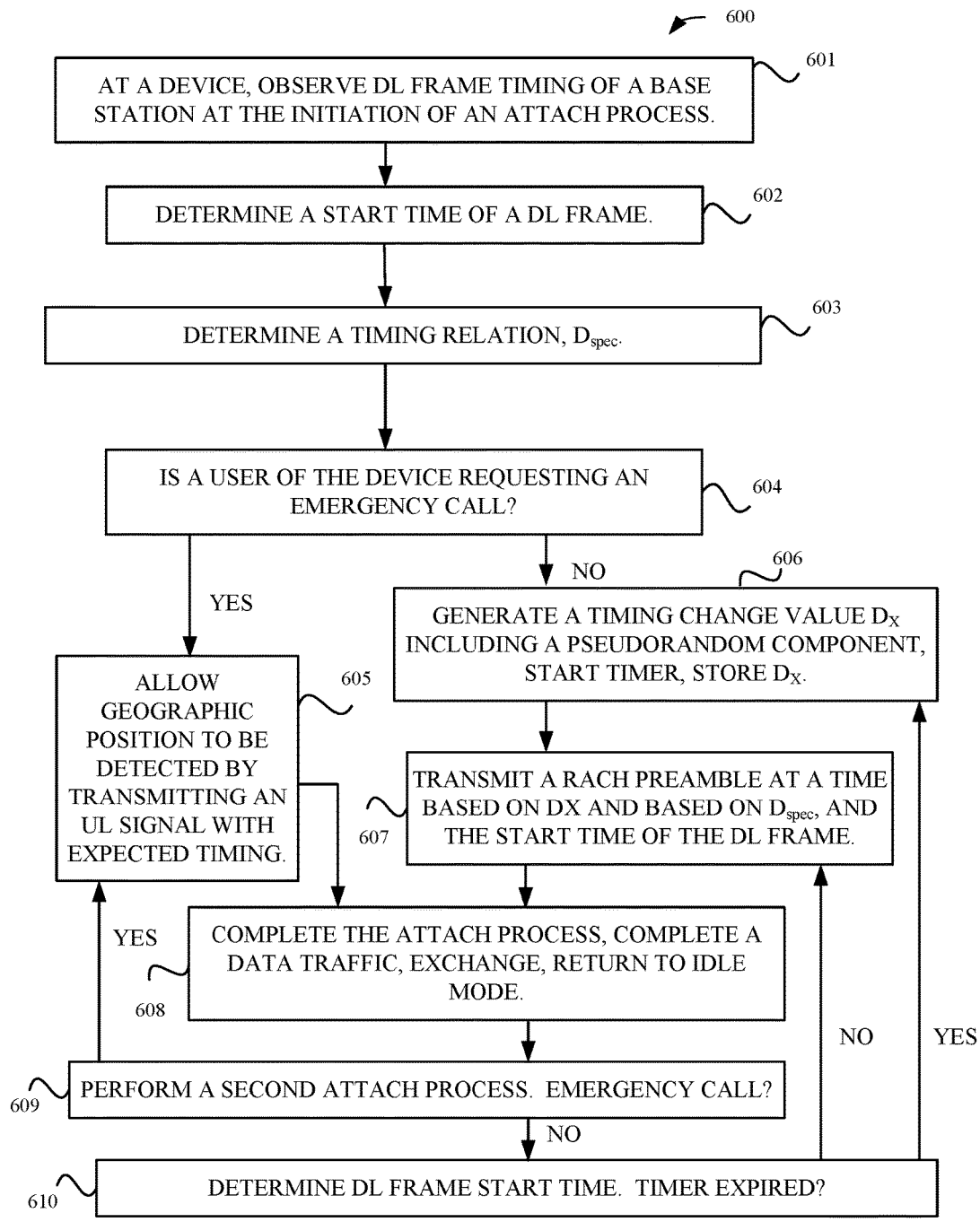
FIG. 6 illustrates exemplary logic for a method of obfuscation of a device geographic position with a timing change value that includes a pseudorandom component, according to some embodiments.

FIG. 6 illustrates exemplary logic 600 for using a timing change value generated randomly. At 601, a device observes DL frame timing. At 602, the device determines a start time of a DL frame. At 603, the device determines a timing relation based on a known value, $D_{spec}$. At 604, in some embodiments, the device determines whether a user of the device is making an emergency call. If yes, the logic flows to 605 and the device follows the timing rules of FIG. 4A with expected timing (no $D_X$ value). If no, the logic flows to 606 and the device generates a random timing change value $D_X$, e.g., a pseudorandom value. The value $D_X$ is such that the observing base station finds the corresponding $D_F$ value plausible. For, example, the device limits that span of values from which $D_X$ is chosen based on an estimate of the approximate cell radius. The device starts a timer and stores $D_X$. At 607, the device transmits a MSG1 as illustrated in FIG. 4B and explained in FIG. 6. At 608, the device completes the attach process, enters a data traffic exchange and ultimately returns to an idle mode. The logic then flows to 609 when the device is coming out of idle mode to perform a second attach process. A check for an emergency call is made, and if none, the logic flows to 610 else 605 (eventually returning to idle mode again). At 610, a DL frame time is determined and the timer is checked. If the timer has not expired, logic flows to 607 and the stored value of timing change value $D_X$ is used to obfuscate geographic position. If the timer has expired, a new value of $D_X$ is generated at 606 and stored and then the logic flows to 607 and so on. FIG. 6 is exemplary of state 304 of FIG. 3.

Logic, Apparently Zero-Delay Method

Figure 7:
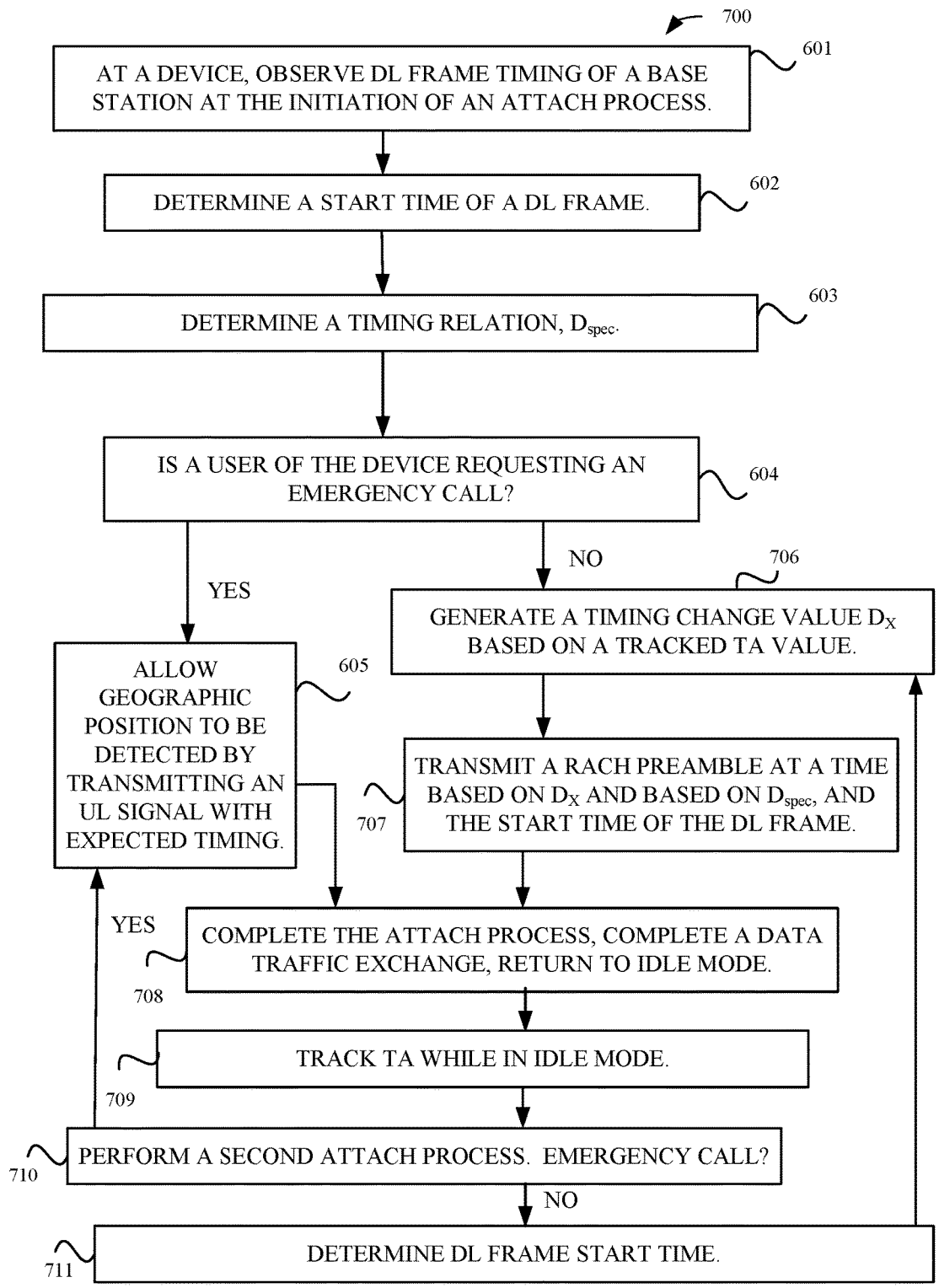
FIG. 7 illustrates exemplary logic for a method of obfuscation of a device geographic position with a timing change value that includes a component based on a tracked TA value, according to some embodiments.

FIG. 7 illustrates exemplary logic 700 that demonstrates the Apparent Zero-Delay Method of state 305 of FIG. 3. The initial operations 601-604 are the same as FIG. 6 and so the reference numerals appear again in FIG. 7. Flow for no emergency call is from 604 to 706. At 706, a timing change value $D_X$ is generated based on a track TA value. The tracked TA value is an estimate of a timing correction to be used so that the base station observes MSG1 with no timing error. In that case, the base station will send a timing advance value of zero because the UL signal has immediately arrived, without correction, in synchronization with UL frames from other devices. Thus, this method is referred to as Apparent Zero-Delay. The device appears to be co-located with the base station tower, i.e., $R_X$=0. This method does not use a timer, because averaging by the base station 131 or the passive attacker 113 will simply continue to establish the range of the device 101 as being 0, and the true value, R, will not be discovered.

From 706 the logic flows to 707 where the device applies the value $D_X$. The logic flows to 708 and the device performs data exchange with the apparent geographic position of being at the cell center. The logic then flows to 709, and the device 101 tracks the base station timing to continually update TA (the device 101 may be moving). At 710, a second attach is imminent and the device checks for an emergency call. If yes, the logic flows to 605, the base station is allowed to recover R, and eventually the logic will flow again to idle mode, part of 708. If no emergency call the logic flows to 711. At 711 a DL frame time is determined and then the logic flows to 706.

In some embodiments, exemplary logic 700 is realized using a method at a UE including receiving, from a base station, a first downlink frame, wherein the first DL frame starts at a first DL start time; determining a second DL start time of a second DL frame based on the first DL start time; determining a first timing relation; generating a timing change value, wherein the timing change value includes a pseudo-random component; starting a timer; transmitting a first uplink frame at a first UL start time with respect to the second DL start time, wherein the first UL start time is based on the timing relation and the timing change value, wherein the first UL frame: i) includes a first random access channel preamble, and ii) is part of a network attach process; receiving a timing advance value from the base station; storing the TA value in a first state memory; and storing the timing change value in a second state memory.

In some embodiments, the method realizing logic 700 includes entering an idle mode; receiving a third DL frame; determining a start time of the third DL frame based on the third DL frame; determining a TA correction based on the start time of the third DL frame; updating the stored TA value to produce an updated TA value; and storing the updated TA value in the first state memory. In some embodiments, the third DL frame is received during a serving cell measurement during a paging cycle.

Some UE Details

Figure 8A:
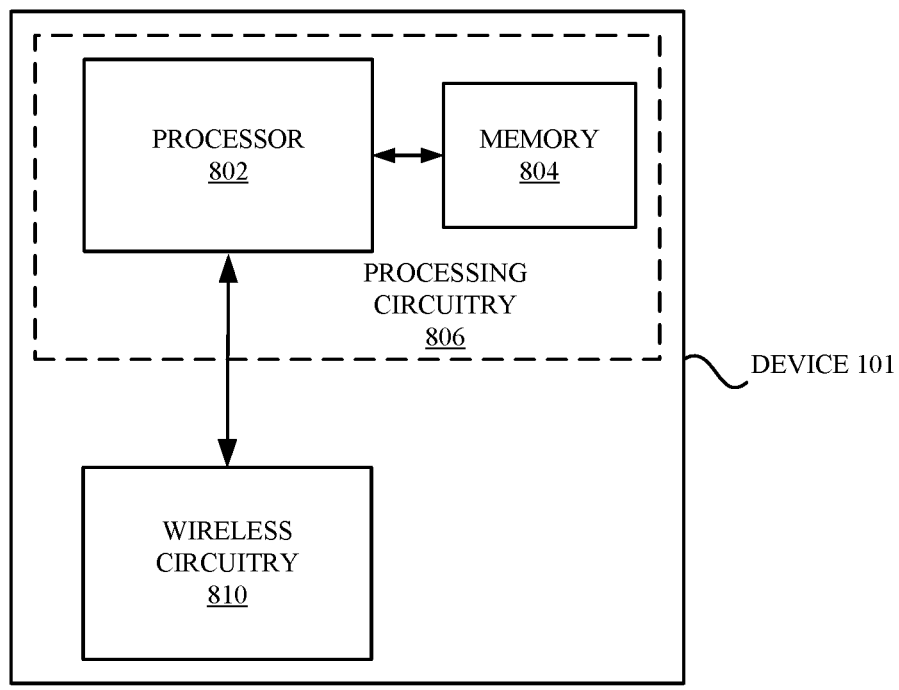
FIG. 8A illustrates exemplary wireless circuitry, processor and memory of the wireless device, according to some embodiments.
Figure 8B:
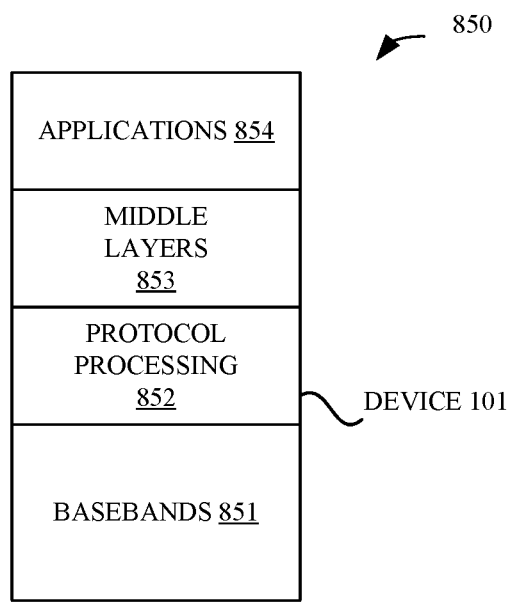
FIG. 8B illustrates an exemplary layer model of the wireless device, according to some embodiments.

FIG. 8A illustrates further detail of the device 101. The device 101 includes wireless circuitry 810 and processing circuitry 806. The processing circuitry 806 includes one or more processors, here represented as a processor 802. The processors communicate with one or more memories, here represented as a memory 804. FIG. 8B illustrates a layer model 850 of the device 101. The layer model 850 includes basebands 851 and protocol processing 852 (e.g., medium access control). The basebands 851 and protocol processing 852 provide software and/or hardware components to support one or more RATs. For example, the basebands 851 and protocol processing 852, in some embodiments, support, in addition to, LTE, Bluetooth® and/or Wi-Fi. FIG. 8B illustrates applications 854, supported by middle layers 853, supported by protocol processing 852 and basebands 851. The applications 854, via a user interface, provide functionality to a user. The applications 854 rely on the lower layers to provide data to them over, for example, the links 131-L, and/or 132-L.

Figure 9:
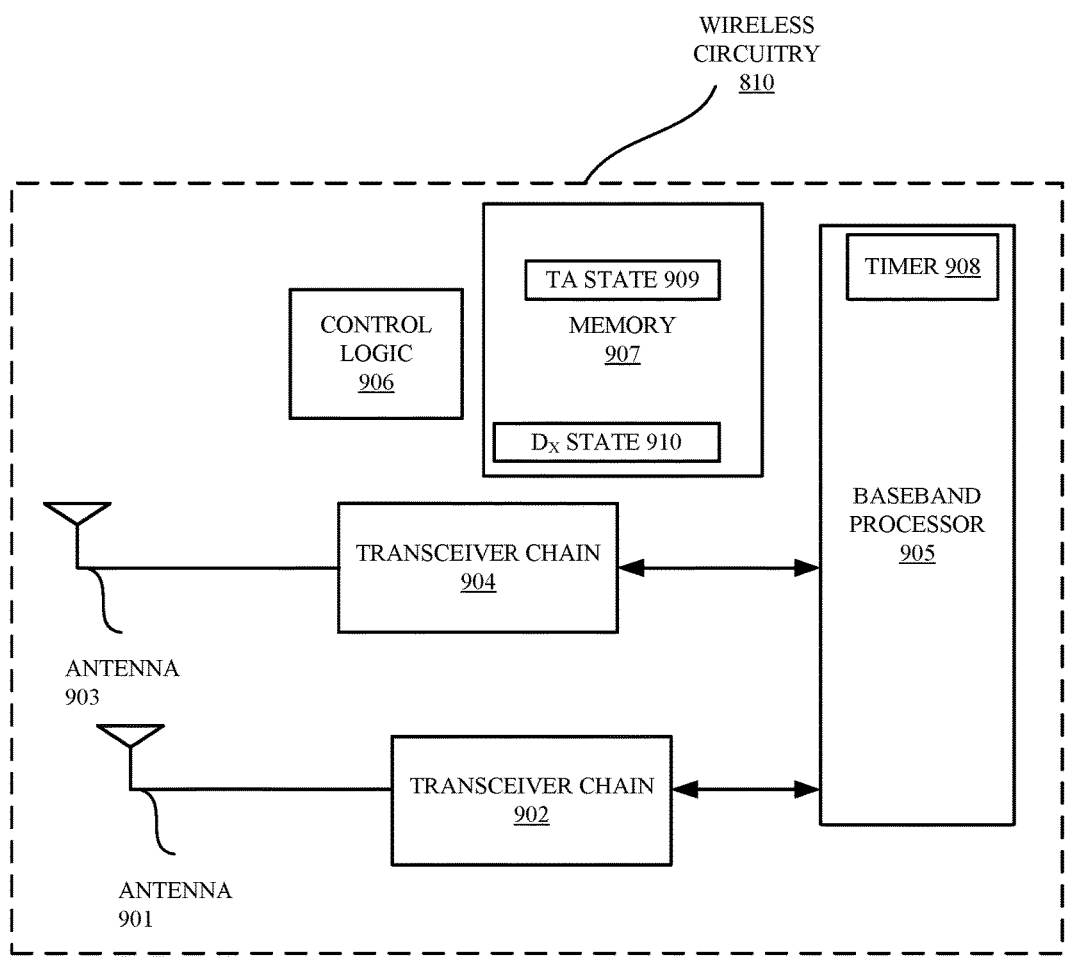
FIG. 9 illustrates further exemplary details of a portion of FIG. 8A, according to some embodiments.

FIG. 9 provides exemplary details of wireless circuitry 810, according to some embodiments. The wireless circuitry includes antennas 901 and 903 connected to transceiver chains 902 and 904, respectively. The transceiver chains are connected to baseband processor 905. The wireless circuitry also includes control logic 906 and memory 907. The baseband processor 905, in some embodiments, performs the protocol processing 852 and provides the timer 908 for use in the Random Method. The baseband processor 905 obtains TA values, and sends RACH preambles and connection request messages. Memory 907, in some embodiments, stores data representing TA state 909 for use in the Apparently Zero-Delay Method and $D_X$ state 910.

Two Base Station Attack

Figure 10:
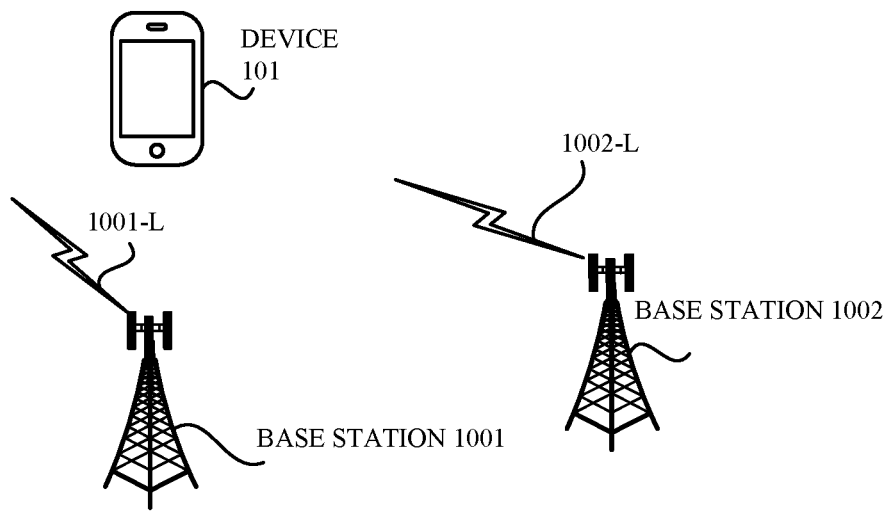
FIG. 10 illustrates a system in which an attacker controls two base stations.

An attacker may control two base stations: base station 1001 and base station 1002 as illustrated in FIG. 10. The attacker may attempt to overcome the timer-based timing change value update by initiating handover of the device 101 from the base station 1001 to the base station 1002. Two spatially separate observations of the same timing change value may reveal information about the device geographic position. In some embodiments, to deter this attack, the device 101 does not check the timer upon handover but instead generates a new timing change value $D_X$ at the time of handover, and restarts the timer.

Sounding Reference Signal

A routine timing advance can be initiated by a base station to account for device mobility. This timing advance update is provided to the base station using uplink sounding reference signal (SRS) transmissions. In some embodiments, the device can maintain the timing change value $D_X$ when sending an SRS signal without modifying this existing artificial delay created by $D_X$.

Paging

After some time, a base station may request another RACH transmission (paging). In some instances the base station desires to locate the device using TA. In some embodiments, if the timer has not expired, the device can respond with the stored (previously established) $D_X$ value. Use of the timer allows the device to defeat statistical averaging attacks by observers. The timer length is designed to be long enough to make such attacks infeasible.

Cell Edge

Connection issues may arise at the cell edge when the UE applies a delay that exceeds the allowed range. In this situation, the UE can sense its potential proximity to the cell edge and respond by only applying random timing advances (rather than either advances or delays).

The UE can determine that it is near an edge of the cell coverage based on one or more of the UE knowledge of timing advance, RACH preamble format (Ncs), and/or neighbor cell measurements. For example, a large timing advance with respect to the serving cell and a strong neighbor cell measurement of a particular neighbor cell implies that the UE is near the cell edge of the serving cell in the direction of the particular neighbor cell. Further details of RACH configurations can be found in 3GPP 36.211.

Figure 11:
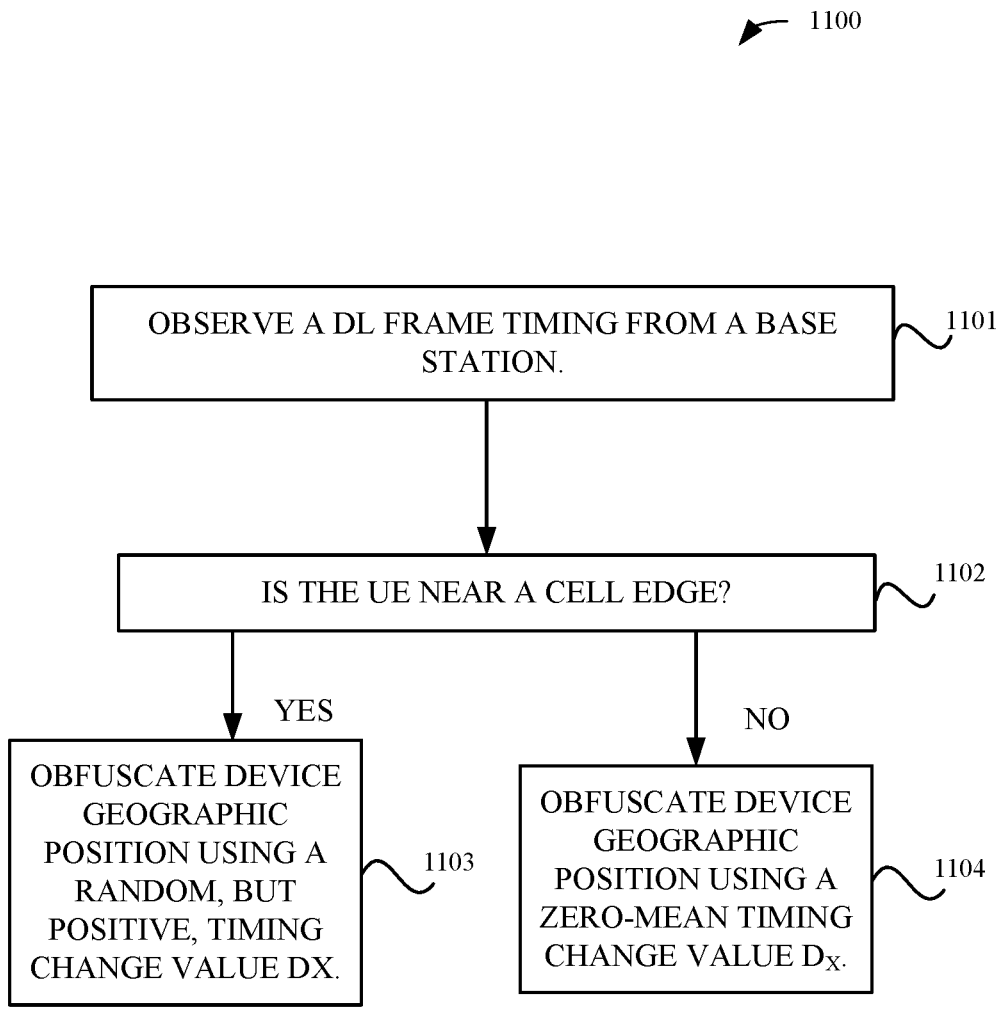
FIG. 11 illustrates exemplary logic for obfuscation of a device geographic position when the device is near a cell edge, according to some embodiments.

FIG. 11 provides exemplary logic 1100 for considering a cell edge effect. At 1101, the device observes DL frame timing. At 1102, the UE determines whether it is near a cell edge. If no, the logic flows to 1104 and the device obfuscates its position using the Random Method or the Apparent Zero-Delay Method. If the UE is near the cell edge, as estimated, the logic flows to 1103 and the UE chooses a random (pseudo-random) $D_X$ that is positive.

In some embodiments, exemplary logic 110 is realized as a method at a UE including receiving, from a base station, a first downlink (DL) frame, wherein the first DL frame starts at a first DL start time; determining a second DL start time of a second DL frame based on the first DL start time; determining a first timing relation; generating a timing change value, wherein: i) the timing change value includes a pseudo-random component, and ii) the timing change value may be positive or negative; starting a timer; transmitting a first uplink (UL) frame at a first UL start time with respect to the second DL start time, wherein the first UL start time is based on the timing relation and the timing change value; and determining that the UE is near an edge of a cell coverage provided by the base station.

In some embodiments, the method realizing exemplary logic 110 includes another step of generating a second timing change value, wherein the second timing value is greater than zero. In some embodiments, the method realizing exemplary logic 110 includes an alternative step of generating a second timing change value, wherein the second timing value is less than zero.

Performance

With an average urban cell radius of 800-1000 meters (m), the device can vary its UL signaling using the timing change value as in FIG. 4B to create a distance ambiguity (R-R$_X$) observed by the base station 131 of 100s of meters, e.g., 300 meters. In a macrocell scenario (100 km cell radius maximum), the device will achieve kilometers of ambiguity. The device has awareness of the cell radius via the RACH preamble format indicated by the base station in system information block 2 (SIB2). The four preambles support cell radii of 14, 28, 75, and 108 km. The device chooses the timing change value $D_X$ to correspond to a distance-of-flight (c times $D_X$, c is the speed of light, i.e. $3 \times 10^8$ meters/s) less than the cell radius. In some embodiments, the $D_X$ value is limited in a manner determined by an estimated cell radius. Thus, the device appears to the based station to be in the cell, but the location information in the TA value has been diminished or eliminated by the use of $D_X$.

Discussion of Various Embodiments

A representative method provided herein includes a user equipment, such as a wireless device, receiving, from a base station, a first downlink frame, wherein the first DL frame starts at a first DL start time; determining a second DL start time of a second DL frame based on the first DL start time; determining a first timing relation; generating a timing change value, wherein the timing change value includes a pseudo-random component; and transmitting a first uplink frame at a first UL start time with respect to the second DL start time, wherein the first UL start time is based on the timing relation and the timing change value. In one embodiment, the first UL frame includes a first random access channel preamble. In one embodiment, generating the timing change value comprises generating the timing change value based on (e.g., limited by) an approximate radius of a cell associated with the base station. In one embodiment, the method also includes receiving a system information block (SIB) from the base station; determining a random access channel configuration based on the SIB; and determining the approximate radius based on the RACH configuration.

In some embodiments, the timing change value corresponds to a time-of-flight, and the time-of-flight is less than a time required for a radio wave to propagate a distance equal to the approximate cell radius. In some embodiments, the method also includes starting a timer before transmitting the first UL frame. In some embodiments, transmitting the first uplink frame is included in a network attach process. In some embodiments, the method also includes receiving a random access response (RAR) message comprising a timing advance value; determining a timing correction based on the TA value and the timing change value; transmitting a second UL frame at a time based on the timing correction; and receiving, in response to the second UL frame, a third DL frame. In some embodiments, the second UL frame includes a scheduled transmission. In one embodiment, the third DL frame serves a contention resolution function. In some embodiments, determining the timing correction comprises summing the TA value and the timing change value.

In some embodiments, the method also includes transmitting a sounding reference signal (SRS) to the base station; receiving a medium access control CE from the base station, wherein the MAC CE includes a second TA value; determining a second timing correction based on the second TA value and the timing change value; and transmitting a third UL frame at a time based on the second timing correction.

In some embodiments, the method includes entering an idle mode; initiating a second network attach process; and when the timer has not expired, the second network attach process comprises: sending a second RACH preamble at a third UL start time, wherein the third UL start time is based on the timing change value.

In some embodiments, the method includes entering an idle mode; initiating a second network attach process; and when the timer has expired, the second network attach process comprises: sending a second RACH preamble at a third UL start time, wherein the third UL start time is based on a second timing change value, and restarting the timer.

In some embodiments, the method includes receiving a paging message from the base station; checking a timer status; and when the timer has not expired: sending a third RACH preamble at a fourth UL start time, wherein the fourth UL start time is based on the timing change value.

In some embodiments, the method includes receiving a signaling message from the base station, wherein the signaling message instructs the UE to handover to a second base station; restarting the timer; generating a third timing change value; sending a third RACH preamble to the second base station, wherein a transmit time of the third RACH preamble is based on the third timing change value; receiving a second RAR from the second base station; parsing a third TA value from the second RAR; and transmitting a second scheduled transmission to the second base station, wherein a transmit time of the second schedule transmission is based on the third TA value and the third timing change value.

In some embodiments, the method includes receiving, from a base station, a first downlink frame, wherein the first DL frame starts at a first DL start time; determining a second DL start time of a second DL frame based on the first DL start time; determining a first timing relation; generating a timing change value, wherein the timing change value includes a pseudo-random component; starting a timer; transmitting a first uplink frame at a first UL start time with respect to the second DL start time, wherein the first UL start time is based on the timing relation and the timing change value, wherein the first UL frame: i) includes a first random access channel preamble, and ii) is part of a network attach process; receiving a timing advance value from the base station; storing the TA value in a first state memory; and storing the timing change value in a second state memory.

In some embodiments, the method includes entering an idle mode; receiving a third DL frame determining a start time of the third DL frame based on the third DL frame; determining a TA correction based on the start time of the third DL frame; updating the stored TA value to produce an updated TA value; and storing the updated TA value in the first state memory.

In some embodiments, the third DL frame is received during a serving cell measurement during a paging cycle.

In some embodiments, the method includes entering an idle mode; initiating a second network attach process; reading the first state memory to produce a retrieved TA value; determining a second timing change based on the retrieved TA value; and sending a second RACH preamble at a third UL start time, wherein the third UL start time is based on a second timing change value.

An additional method provided herein discloses a method by a UE including receiving, from a base station, a first downlink frame, wherein the first DL frame starts at a first DL start time; determining a second DL start time of a second DL frame based on the first DL start time; determining a first timing relation; generating a timing change value, wherein: i) the timing change value includes a pseudo-random component, and ii) the timing change value may be positive or negative; starting a timer; transmitting a first uplink frame at a first UL start time with respect to the second DL start time, wherein the first UL start time is based on the timing relation and the timing change value.

In some embodiments of the additional method, the determining that the UE is near an edge of the cell coverage is based on one or more of the UE knowledge of timing advance, RACH preamble format (Ncs), and/or neighbor cell measurements. For example, a large timing advance with respect to the serving cell and a strong neighbor cell measurement of a particular neighbor cell imply that the UE is near the cell edge of the serving cell in the direction of the particular neighbor cell.

In some embodiments, of the additional method includes generating a second timing change value, wherein the second timing value is greater than zero while other embodiments include generating a second timing change value, wherein the second timing value is less than zero.

In yet another method by a UE provided herein includes receiving, from a base station, a first downlink frame, wherein the first DL frame starts at a first DL start time; determining a second DL start time of a second DL frame based on the first DL start time; determining a first timing relation; generating a first timing change value, wherein: i) the first timing change value includes a pseudo-random component, and ii) the first timing changing value is intended to obfuscate a geographic position of the UE; transmitting a first uplink frame at a first UL start time with respect to the second DL start time, wherein the first UL start time is based on the timing relation and the first timing change value, wherein the first UL frame is part of a network attach process; determining that a user of the UE has requested an emergency call; and beginning a second network attach process including using a second timing change value of zero to allow the base station to estimate the geographic position of the UE.

Wireless Devices, General Discussion

Wireless devices, and mobile devices in particular, can incorporate multiple different radio access technologies (RATs) to provide connections through different wireless networks that offer different services and/or capabilities. A wireless device can include hardware and software to support a wireless personal area network ("WPAN") according to a WPAN communication protocol, such as those standardized by the Bluetooth® special interest group ("SIG") and/or those developed by Apple referred to as an Apple Wireless Direct Link (AWDL). The wireless device can discover compatible peripheral wireless devices and can establish connections to these peripheral wireless devices located in order to provide specific communication services through a WPAN. In some situations, the wireless device can act as a communications hub that provides access to a wireless local area network ("WLAN") and/or to a wireless wide area network ("WWAN") to a wide variety of services that can be supported by various applications executing on the wireless device. Thus, communication capability for an accessory wireless device, e.g., without and/or not configured for WWAN communication, can be extended using a local WPAN (or WLAN) connection to a companion wireless device that provides a WWAN connection. Alternatively, the accessory wireless device can also include wireless circuitry for a WLAN connection and can originate and/or terminate connections via a WLAN connection. Whether to use a direct connection or a relayed connection can depend on performance characteristics of one or more links of an active communication session between the accessory wireless device and a remote device. Fewer links (or hops) can provide for lower latency, and thus a direct connection can be preferred; however, unlike a legacy circuit-switched connection that provides a dedicated link, the direct connection via a WLAN can share bandwidth with other wireless devices on the same WLAN and/or with the backhaul connection from the access point that manages the WLAN. When performance on the local WLAN connection link and/or on the backhaul connection degrades, a relayed connection via a companion wireless device can be preferred. By monitoring performance of an active communication session and availability and capabilities of associated wireless devices (such as proximity to a companion wireless device), an accessory wireless device can request transfer of an active communication session between a direction connection and a relayed connection or vice versa.

In accordance with various embodiments described herein, the terms "wireless communication device," "wireless device," "mobile device," "mobile station," "wireless station", "wireless access point", "station", "access point" and "user equipment" (UE) may be used herein to describe one or more common consumer electronic devices that may be capable of performing procedures associated with various embodiments of the disclosure. In accordance with various implementations, any one of these consumer electronic devices may relate to: a cellular phone or a smart phone, a tablet computer, a laptop computer, a notebook computer, a personal computer, a netbook computer, a media player device, an electronic book device, a WiFi® device, a wearable computing device, as well as any other type of electronic computing device having wireless communication capability that can include communication via one or more wireless communication protocols such as used for communication on: a wireless wide area network (WWAN), a wireless metro area network (WMAN) a wireless local area network (WLAN), a wireless personal area network (WPAN), a near field communication (NFC), a cellular wireless network, a fourth generation (4G) LTE, LTE Advanced (LTE-A), and/or 5G or other present or future developed advanced cellular wireless networks.

The wireless device, in some embodiments, can also operate as part of a wireless communication system, which can include a set of client devices, which can also be referred to as stations, client wireless devices, or client wireless devices, interconnected to an access point (AP), e.g., as part of a WLAN, and/or to each other, e.g., as part of a WPAN and/or an "ad hoc" wireless network, such as a Wi-Fi direct connection. In some embodiments, the client device can be any wireless device that is capable of communicating via a WLAN technology, e.g., in accordance with a wireless local area network communication protocol. In some embodiments, the WLAN technology can include a Wi-Fi (or more generically a WLAN) wireless communication subsystem or radio, the Wi-Fi radio can implement an Institute of Electrical and Electronics Engineers (IEEE) 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; IEEE 802.11ax; or other present or future developed IEEE 802.11 technologies.

Additionally, it should be understood that the wireless devices described herein may be configured as multi-mode wireless communication devices that are also capable of communicating via different third generation (3G) and/or second generation (2G) RATs. In these scenarios, a multi-mode wireless device or UE can be configured to prefer attachment to LTE networks offering faster data rate throughput, as compared to other 3G legacy networks offering lower data rate throughputs. For instance, in some implementations, a multi-mode wireless device or UE may be configured to fall back to a 3G legacy network, e.g., an Evolved High Speed Packet Access (HSPA+) network or a Code Division Multiple Access (CDMA) 2000 Evolution-Data Only (EV-DO) network, when LTE and LTE-A networks are otherwise unavailable.

Multiple access schemes can be based on time division, frequency division, and hybrids of these, for example direct sequence spread spectrum code division. When a transmitter has multiple antennas, more than one receiver can be served at the same time based on beamforming if the transmitter has channel state information. When both the transmitter and the receiver have two or more antennas, multiple streams can be sent by the transmitter to the receiver. These streams can be separated at the receiver when channel state information is known with respect to the transmit and receive antennas. Each transmitted stream corresponds to a particular transmit vector based on a decomposition of a joint channel matrix.

Representative Exemplary Apparatus

Figure 12:
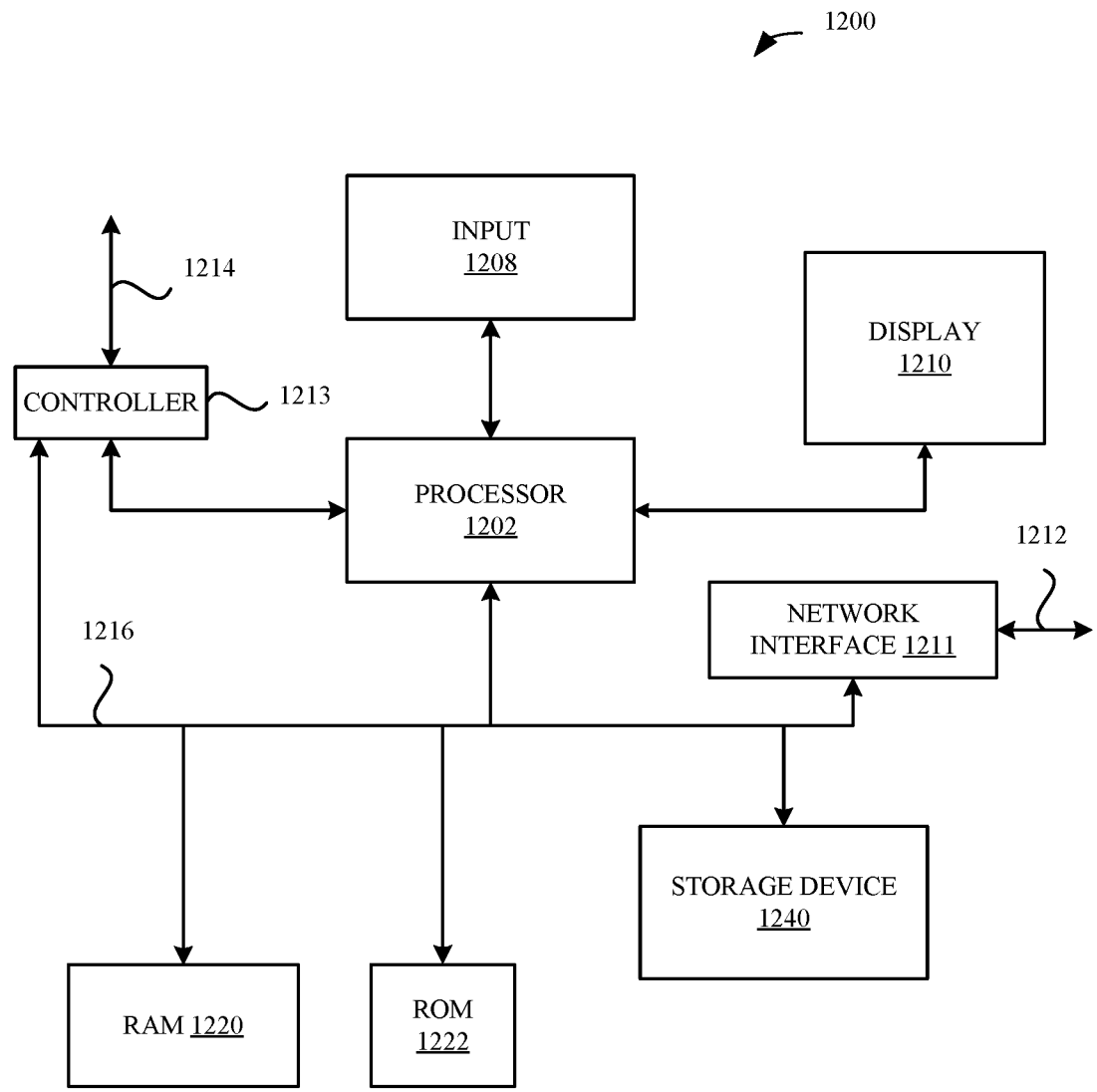
FIG. 12 illustrates an exemplary apparatus for implementation of the embodiments disclosed herein, according to some embodiments.

FIG. 12 illustrates in block diagram format an exemplary computing device 1200 that can be used to implement the various components and techniques described herein, according to some embodiments. In particular, the detailed view of the exemplary computing device 1200 illustrates various components that can be included in the device 101 illustrated in, e.g., FIGS. 1, 8A, 8B, 9, and 10. As shown in FIG. 12, the computing device 1200 can include a processor 1202 that represents a microprocessor or controller for controlling the overall operation of computing device 1200. The computing device 1200 can also include a user input device 1208 that allows a user of the computing device 1200 to interact with the computing device 1200. For example, the user input device 1208 can take a variety of forms, such as a button, keypad, dial, touch screen, audio input interface, visual/image capture input interface, input in the form of sensor data, etc. Still further, the computing device 1200 can include a display 1210 (screen display) that can be controlled by the processor 1202 to display information to the user (for example, information relating to incoming, outgoing, or active communication session). A data bus 1216 can facilitate data transfer between at least a storage device 1240, the processor 1202, and a controller 1213. The controller 1213 can be used to interface with and control different equipment through an equipment control bus 1214. The computing device 1200 can also include a network/bus interface 1211 that couples to a data link 1212. In the case of a wireless connection, the network/bus interface 1211 can include wireless circuitry, such as a wireless transceiver and/or baseband processor.

The computing device 1200 also includes a storage device 1240, which can comprise a single storage or a plurality of storages (e.g., hard drives), and includes a storage management module that manages one or more partitions within the storage device 1240. In some embodiments, storage device 1240 can include flash memory, semiconductor (solid state) memory or the like. The computing device 1200 can also include a Random Access Memory ("RAM") 1220 and a Read-Only Memory ("ROM") 1222. The ROM 1222 can store programs, utilities or processes to be executed in a non-volatile manner. The RAM 1220 can provide volatile data storage, and stores instructions related to the operation of the computing device 1200.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium. In some embodiments, the computer readable medium is a non-transitory computer readable medium. The computer readable medium is any data storage device that can store data which can thereafter be read by a computer system. Examples of the computer readable medium include read-only memory, random-access memory, CD-ROMs, DVDs, magnetic tape, hard storage drives, solid state drives, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method comprising:
    at a user equipment (UE):
        receiving, from a base station, a first downlink (DL) frame, wherein the first DL frame starts at a first DL start time;
        determining a second DL start time of a second DL frame based on the first DL start time;
        determining a first timing relation;
        generating a timing change value, wherein the timing change value includes a pseudo-random component; and
        transmitting a first uplink (UL) frame at a first UL start time with respect to the second DL start time, wherein the first UL start time is based on the timing relation and the timing change value.

2. The method of claim 1, wherein generating the timing change value comprises generating the timing change value based on an approximate radius of a cell associated with the base station.

3. The method of claim 2, further comprising:
    receiving a system information block (SIB) from the base station;
    determining a random access channel (RACH) configuration based on the SIB; and
    determining the approximate radius based on the RACH configuration.

4. The method of claim 2, wherein the timing change value corresponds to a time-of-flight, and the time-of-flight is less than a time required for a radio wave to propagate a distance equal to the approximate cell radius.

5. The method of claim 1, wherein the first UL frame includes a first random access channel (RACH) preamble.

6. The method of claim 5, further comprising:
    starting a timer before transmitting the first UL frame.

7. The method of claim 6, further comprising:
    entering an idle mode;
    initiating a second network attach process; and
    when the timer has expired, the second network attach process comprises:
        i) sending a second RACH preamble at a third UL start time, wherein the third UL start time is based on a second timing change value,
        ii) restarting the timer,
        iii) receiving a signaling message from the base station, wherein the signaling message instructs the UE to handover to a second base station,
        iv) restarting the timer,
        v) generating a third timing change value,
        vi) sending a third RACH preamble to the second base station, wherein a transmit time of the third RACH preamble is based on the third timing change value,
        vii) receiving a second RAR from the second base station,
        viii) parsing a third TA value from the second RAR, and
        ix) transmitting a second scheduled transmission to the second base station, wherein a transmit time of the second schedule transmission is based on the third TA value and the third timing change value.

8. The method of claim 6, wherein transmitting the first uplink frame is included in a network attach process.

9. The method of claim 8, further comprising:
    transmitting a sounding reference signal (SRS) to the base station;
    receiving a medium access control (MAC) control element (CE) from the base station, wherein the MAC CE includes a second TA value;
    determining a timing correction based on the second TA value and the timing change value; and
    transmitting a third UL frame at a time based on the timing correction.

10. The method of claim 8, further comprising:
    receiving a random access response (RAR) message comprising a timing advance (TA) value;
    determining a timing correction based on the TA value and the timing change value;
    transmitting a second UL frame at a time based on the timing correction; and
    receiving, in response to the second UL frame, a third DL frame.

11. The method of claim 10, wherein the second UL frame includes a scheduled transmission, and the third DL frame serves a contention resolution function.

12. The method of claim 10, wherein the determining a timing correction comprises summing the TA value and the timing change value.

13. The method of claim 6, further comprising:
    entering an idle mode;
    initiating a second network attach process; and when the timer has not expired, the second network attach process comprises:
sending a second RACH preamble at a third UL start time, wherein the third UL start time is based on the timing change value.

14. The method of claim 13, further comprising:
after the sending a second RACH preamble:
receiving a paging message from the base station;
when the timer has not expired:
sending a third RACH preamble at a fourth UL start time, wherein the fourth UL start time is based on the timing change value.

15. A user equipment (UE) comprising:
a memory; and
one or more processors, wherein the memory includes instructions that when executed by a processor of the one or more processors cause the UE to perform operations comprising:
receiving, from a base station, a first downlink (DL) frame, wherein the first DL frame starts at a first DL start time,
determining a second DL start time of a second DL frame based on the first DL start time,
determining a first timing relation,
generating a timing change value, wherein: i) the timing change value includes a pseudo-random component, and ii) the timing change value is based on an approximate radius of a cell associated with the base station, and
transmitting a first uplink (UL) frame at a first UL start time with respect to the second DL start time, wherein the first UL start time is based on the timing relation and the timing change value.

16. The UE of claim 15, wherein the operations further comprise:
receiving a system information block (SIB) from the base station;
determining a random access channel (RACH) configuration based on the SIB; and
determining the approximate radius based on the RACH configuration.

17. The UE of claim 16, wherein the timing change value corresponds to a time-of-flight, and the time-of-flight is less than a time required for a radio wave to propagate a distance equal to the approximate cell radius.

18. A non-transitory computer readable medium including instructions that when executed by a processor of a user equipment (UE), cause the UE to perform operations comprising:
receiving, from a base station, a first downlink (DL) frame, wherein the first DL frame starts at a first DL start time;
determining a second DL start time of a second DL frame based on the first DL start time;
determining a first timing relation;
generating a timing change value, wherein the timing change value includes a pseudo-random component;
transmitting a first uplink (UL) frame at a first UL start time with respect to the second DL start time, wherein the first UL start time is based on the timing relation and the timing change value.

19. The non-transitory computer readable medium of claim 18, wherein generating the timing change value comprises generating the timing change value based on an approximate radius of a cell associated with the base station.

20. The non-transitory computer readable medium of claim 19, wherein the timing change value corresponds to a time-of-flight, and the time-of-flight is less than a time required for a radio wave to propagate a distance equal to the approximate cell radius.

* * * * *